United States Patent
Murad et al.

(10) Patent No.: US 10,594,958 B2
(45) Date of Patent: Mar. 17, 2020

(54) CAMERA IMAGER BINNING TECHNIQUE

(71) Applicant: GM GLOBAL TECHNOLOGY OPERATIONS LLC, Detroit, MI (US)

(72) Inventors: Mohannad Murad, Troy, MI (US); Joseph G. Machak, Oakland Township, MI (US); Donald R. Gignac, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 221 days.

(21) Appl. No.: 15/789,563

(22) Filed: Oct. 20, 2017

(65) Prior Publication Data

US 2019/0124275 A1 Apr. 25, 2019

(51) Int. Cl.
| | |
|---|---|
| *H04N 7/18* | (2006.01) |
| *H04N 5/347* | (2011.01) |
| *B60R 1/00* | (2006.01) |
| *H04N 5/225* | (2006.01) |
| *H04N 5/351* | (2011.01) |

(52) U.S. Cl.
CPC .............. *H04N 5/347* (2013.01); *B60R 1/00* (2013.01); *H04N 5/2256* (2013.01); *H04N 5/351* (2013.01); *B60R 2300/103* (2013.01); *B60R 2300/105* (2013.01); *B60R 2300/207* (2013.01); *B60R 2300/40* (2013.01); *B60R 2300/406* (2013.01); *B60R 2300/8033* (2013.01); *B60R 2300/8066* (2013.01); *B60R 2300/8093* (2013.01)

(58) Field of Classification Search
CPC . H04N 5/347; H04N 5/2256; B60R 2300/105
USPC .......................................................... 348/148
See application file for complete search history.

(56) References Cited

U.S. PATENT DOCUMENTS

| | | | |
|---|---|---|---|
| 5,737,452 A * | 4/1998 | Schiller | H04N 1/4051 358/3.2 |
| 2010/0172542 A1* | 7/2010 | Stein | G06K 9/00798 382/103 |

\* cited by examiner

*Primary Examiner* — Masum Billah
(74) *Attorney, Agent, or Firm* — Lorenz & Kopf, LLP (57) ABSTRACT

Methods and systems are provided for controlling camera images for a camera of a vehicle are provided. In certain examples, a vehicle includes a camera, an input unit, and a processor. The input unit is configured to obtain data pertaining to a light pattern in proximity to the vehicle. The processor is configured to at least facilitate: (i) determining the light pattern in proximity to the vehicle using the data; and (ii) providing instructions for selectively binning the camera images based on the light pattern, the selectively binning including binning first pixels together for a particular image or portion thereof, but leaving second pixels for the particular image un-binned, based on the light pattern.

17 Claims, 6 Drawing Sheets

CAMERA IMAGER BINNING TECHNIQUE

TECHNICAL FIELD

The technical field generally relates to the field of vehicles and, more specifically, to methods and systems for controlling cameras of a vehicle.

INTRODUCTION

Many vehicles include one or more cameras that provide views in proximity to the vehicle. However, in certain circumstances the cameras may be part of a system that does not always provide optimal images in certain situations.

Accordingly, it is desirable to provide improved methods and systems for controlling cameras in vehicles. Furthermore, other desirable features and characteristics will become apparent from the subsequent detailed description of exemplary embodiments and the appended claims, taken in conjunction with the accompanying drawings.

SUMMARY

In accordance with exemplary embodiments, a method for controlling camera images for a camera of a vehicle is provided. In various embodiments, the method includes (i) determining a light pattern in proximity to the vehicle; and (ii) selectively binning pixels of the camera images based on the light pattern, the selectively binning including binning first pixels together for a particular image or portion thereof, but leaving second pixels for the particular image un-binned, based on the light pattern.

Also in certain embodiments, (i) the step of determining the light pattern includes: (a) determining one or more bright regions for the light pattern, the one or more bright regions each having a respective light intensity that is greater than a predetermined threshold; and (b) determining one or more dark regions for the light pattern, the one or more dark regions each having a respective light intensity that is less than the predetermined threshold; and (ii) the step of selectively binning the camera images includes, for each camera image: (a) binning the pixels together into one or more binned pixel groups for one or more first portions of the camera image corresponding to the dark regions; and (b) leaving the pixels un-binned for one or more second portions of the camera image corresponding to the bright regions.

Also in certain embodiments, the method includes determining an amount of darkness for each of the dark regions; and for each particular dark region, the size of the one or more binned pixel groups for the particular dark region is determined based on the amount of darkness for the particular dark region.

Also in certain embodiments, the vehicle includes a light sensor; and the step of determining the light pattern includes determining the light pattern based on measurements from the light sensor.

Also in certain embodiments, the vehicle includes a location device; and the step of determining the light pattern includes determining the light pattern based on information as to a location of the vehicle as obtained via the location device.

Also in certain embodiments, the vehicle includes a lighting system; and the step of determining the light pattern includes determining the light pattern based on known operation of the lighting system.

Also in certain embodiments, the vehicle includes a lighting system; and the step of determining the light pattern comprises determining the light pattern based on data from a light sensor, data from a location sensor, and known operation of the lighting system.

In accordance with another exemplary embodiment, a system is provided for controlling camera images for a camera. In various embodiments, the system includes an input unit and a processor. The input unit is configured to obtain data pertaining to a light pattern in proximity to the camera. The processor is configured to at least facilitate: (i) determining the light pattern in proximity to the vehicle using the data; and (ii) providing instructions for selectively binning the camera images based on the light pattern, the selectively binning including binning first pixels together for a particular image or portion thereof, but leaving second pixels for the particular image un-binned, based on the light pattern.

Also in certain embodiments, the processor is configured to at least facilitate: (i) determining one or more bright regions for the light pattern, the one or more bright regions each having a respective light intensity that is greater than a predetermined threshold; (ii) determining one or more dark regions for the light pattern, the one or more dark regions each having a respective light intensity that is less than the predetermined threshold; and (iii) providing instructions for the selectively binning of the camera images by, for each camera image: (a) binning the pixels together into one or more binned pixel groups for one or more first portions of the camera image corresponding to the dark regions; and (b) leaving the pixels un-binned for one or more second portions of the camera image corresponding to the bright regions.

Also in certain embodiments, the processor is configured to at least facilitate: determining an amount of darkness for each of the dark regions; and for each particular dark region, determining the size of the one or more binned pixel groups for the particular dark region based on the amount of darkness for the particular dark region.

Also in certain embodiments, the input unit includes a light sensor; and the processor is configured to at least facilitate determining the light pattern based on measurements from the light sensor.

Also in certain embodiments, the camera is implemented in a vehicle; the input unit includes a vehicle location device for the vehicle; and the processor is configured to at least facilitate determining the light pattern based on information as to a location of the vehicle as obtained via the vehicle location device.

Also in certain embodiments, the camera is implemented in a vehicle having a lighting system; and the processor is configured to at least facilitate determining the light pattern based on known operation of the lighting system.

Also in certain embodiments, the input unit includes a light sensor and a location sensor; the camera is implemented in a vehicle having a lighting system; and the processor is configured to at least facilitate determining the light pattern based on data from the light sensor, data from the location sensor, and known operation of the lighting system.

In accordance with a further exemplary embodiment, a vehicle is provided. In various embodiments, the vehicle includes a camera, an input unit, and a processor. The input unit is configured to obtain data pertaining to a light pattern in proximity to the vehicle. The processor is configured to at least facilitate: (i) determining the light pattern in proximity to the vehicle using the data; and (ii) providing instructions for selectively binning the camera images based on the light pattern, the selectively binning including binning first pixels together for a particular image or portion thereof, but leaving second pixels for the particular image un-binned, based on the light pattern.

Also in certain embodiments, the input unit includes a light sensor; and the processor is configured to at least facilitate determining the light pattern based on measurements from the light sensor.

Also in certain embodiments, the input unit includes a vehicle location device; and the processor is configured to at least facilitate determining the light pattern based on information as to a location of the vehicle as obtained via the vehicle location device.

Also in certain embodiments, the vehicle includes a lighting system; and the processor is configured to at least facilitate determining the light pattern based on known operation of the lighting system.

Also in certain embodiments, the input unit includes a light sensor and a location sensor; and the processor is configured to at least facilitate determining the light pattern based on data from the light sensor, data from the location sensor, and known operation of the lighting system.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
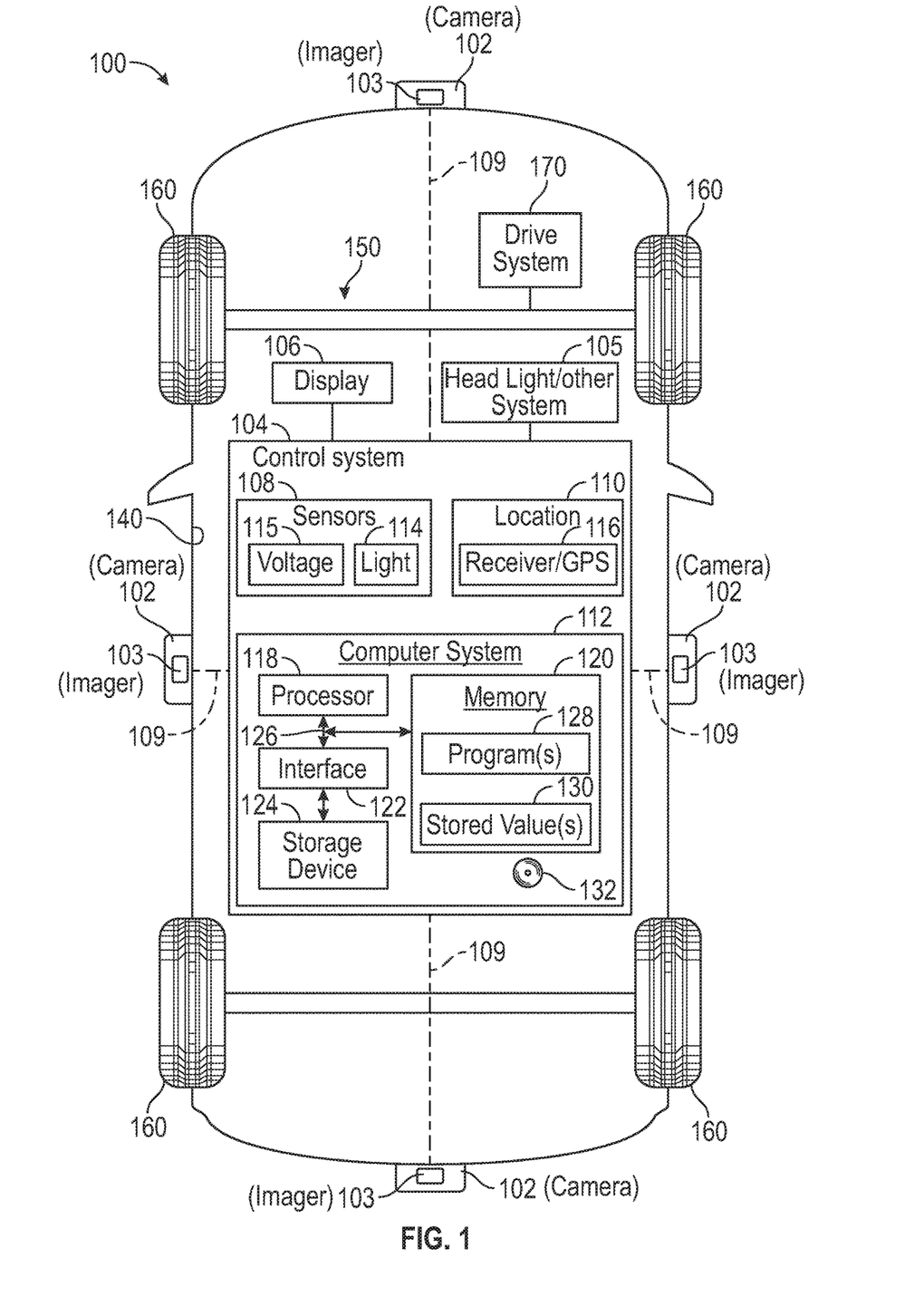
FIG. 1 is a functional block diagram of a vehicle that includes a camera and a control system, in accordance with exemplary embodiments.

FIG. 1 illustrates a vehicle 100, according to an exemplary embodiment. As described in greater detail further below, the vehicle 100 includes one or more cameras 102, a control system 104, and a display 106.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, or other system having a camera image with a fixed referenced point.

In various embodiments, the vehicle 100 includes a body 140 that is arranged on a chassis 150. The body 140 substantially encloses other components of the vehicle 100. The body 140 and the chassis 150 may jointly form a frame. The vehicle 100 also includes a plurality of wheels 160. The wheels 160 are each rotationally coupled to the chassis 150 near a respective corner of the body 140 to facilitate movement of the vehicle 100. In one embodiment, the vehicle 100 includes four wheels 160, although this may vary in other embodiments (for example for trucks and certain other vehicles).

A drive system 170 is mounted on the chassis 150, and drives the wheels 160. The drive system 170 preferably comprises a propulsion system. In certain exemplary embodiments, the drive system 170 comprises an internal combustion engine and/or an electric motor/generator, coupled with a transmission thereof. In certain embodiments, the drive system 170 may vary, and/or two or more drive systems 170 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In various embodiments, the vehicle 100 also includes one or more other systems 105. For example, in certain embodiments, the other systems 105 include one or more lighting systems (e.g., a headlight system and/or other exterior, interior, and/or other light or lighting systems) that affect light conditions inside or outside the vehicle 100.

As depicted in FIG. 1, in various embodiments, the cameras 102 may be disposed at any number of locations within or on the vehicle 100. For example, the cameras 102 may be disposed at or toward the front of the vehicle 100, the rear of the vehicle, the driver and/or passenger sides of the vehicle 100, and/or any number of other locations within or on the vehicle 100.

As depicted in FIG. 1, in various embodiments each camera 102 includes a respective imager 103. In various embodiments, the imager 103 is built in as part of the camera 102. Also in certain embodiments, the imager 103 includes a built-in image sensor and/or a built-in light sensor for determining a voltage of different pixels and groups of pixels for camera images for the camera 102.

The cameras 102 provide images of views that are in proximity to the vehicle 100 (e.g., of views outside and/or inside the vehicle 100). In various embodiments, the camera images are providing for viewing on one or more displays 106 that are disposed inside the vehicle 100 (i.e., inside the body 140 of the vehicle 100) and/or providing images for one or more other vehicle units and/or systems, for example for machine vision applications such as pedestrian detection or object detection, and so on. In certain embodiments, the display 106 is part of a center console of the vehicle 100. In various embodiments, the display 106 may be part of a radio display, a navigation display, and/or other display, for example as part of or in proximity to the center console. In certain other embodiments, the display 106 may be part of one or more other vehicle 100 components, such as a rear view mirror. In one exemplary embodiment the display 106 comprises a liquid crystal display (LCD) screen or a light emitting diode (LED) screen. However, this may vary in other embodiments. Also in certain embodiments, the cameras 102 provide other images and/or other information for the vehicle 100 (e.g., information to a vehicle control system for use in vehicle control). In various embodiments, the camera images may comprise still images and/or video images.

Also in various embodiments, the cameras 102 may provide camera images (e.g., still camera images and/or video camera images) of any number of different views outside the vehicle (e.g., in front of the vehicle 100, behind the vehicle 100, outside of the driver side of the vehicle 100, outside of the passenger side of the vehicle 100, above the vehicle 100, below the vehicle 100, inside the vehicle 100, various angles in between and/or combinations thereof, and so on.

The cameras 102 are controlled via the control system 104, as depicted in FIG. 1. In various embodiments, the control system 104 controls the selective binning of pixels of the cameras 102 for the imager 103 of the camera 102 based on light patterns in proximity to the vehicle 100, for example as discussed further below in connection with the process 200 of FIG. 2 as well as the illustrations of FIGS. 3-8. Also in various embodiments, the control system 104 also provides other functionality for the cameras 102, such as the processing of the camera images, instructions for displaying the images, and so on. As depicted in FIG. 1, in certain embodiments, a single control system 104 may perform such functions for each of the cameras 102 of the vehicle 100. In certain other embodiments, multiple control systems 104 may be utilized for different respective cameras 102. In addition, in certain embodiments a control system 104 may be coupled to a respective camera 102, and in other embodiments the control system 104 may be part of a respective camera 102 (for example, as part of an imager 103 thereof).

Also as depicted in FIG. 1, in various embodiments the control system 104 is coupled to the camera 102 via a communications link 109, and receives camera images from the camera 102 via the communications link 109. In certain embodiments, the communications link 109 comprises one or more wired connections, such as one or more cables (e.g. coaxial cables and/or one or more other types of cables). In other embodiments, the communications link 109 may comprise one or more wireless connections, e.g., using a transceiver (not depicted in FIG. 1). In yet other embodiments, as noted above, the control system 104 (and/or certain components thereof) may be part of the camera 102.

As depicted in FIG. 1, the control system 104 includes one or more sensors 108, one or more location devices 110, and a controller 112. Also in certain embodiments the control system 104 may also include and/or be part of one or more of the cameras 102 (e.g., an imager (or an image signal processor (ISP)) 103 thereof), and/or one or more components thereof.

The one or more sensors 108 generate sensor data, and provide the sensor data to the controller 112 for processing. As depicted in FIG. 1, the one or more sensors 108 include one or more light sensors 114 and image sensors 115.

In various embodiments, the light sensors 114 detect light conditions outside and/or inside the vehicle 100. In various embodiments, the light sensors 114 obtain data that is indicative of whether different regions included or to be included in camera images for the cameras 102 are "bright regions" or "dark regions" (based on light intensity in the particular region), for use by the controller 112 in selectively binning pixels for the camera images for the cameras 102. In certain embodiments, the light sensors 114 measure light for regions outside the vehicle 100 that are to be included in camera images for the cameras 102 (e.g., for outward facing cameras). Also in certain embodiments, the light sensors 114 also measure light for regions inside the vehicle 100 that are to be included in camera images for the cameras 102 (e.g., for inward facing cameras). In certain embodiments, the light sensors 114 are part of the camera 102.

In various embodiments, the image sensors 115 measure voltage of different pixels of a camera image (e.g., of a camera image frame). In certain embodiments, the image sensors 115 are part of the camera 102 (e.g., as part of the imager 103 thereof).

The one or more location devices 110 generate location data, and provide the location data to the controller 112 for processing. As depicted in FIG. 1, the one or more location devices 110 include a receiver 116 (e.g., a transceiver) for obtaining information regarding a location in which the vehicle 100 is travelling. In certain embodiments, the receiver 116 is part of a satellite-based location system, such as a global positioning system (GPS). In certain other embodiments, the receivers 116 may participate in one or more other types of communication (e.g., cellular and/or other wireless vehicle to vehicle communications, vehicle to infrastructure communications, and so on). In certain embodiments, one or more receivers 116 may also obtain system data from the one or more other systems 105 (e.g., a vehicle headlight system or other light systems) of FIG. 1.

In various embodiments, the controller 112 is coupled to the cameras 102 (e.g., the imagers 103 thereof), as well as to the one or more sensors 108 and location devices 110, and one or more other systems 105 (e.g., a vehicle headlight system, a vehicle interior lighting system, and/or one or more other vehicle light systems). Also in various embodiments, the controller 112 controls operation of the camera 102, and the imager 103 thereof.

In various embodiments, the controller 112 selectively bins certain pixels of the camera images for the camera 102 based on whether various regions to be included in the camera images are "bright regions" or "dark regions" (e.g., in terms of light intensity), as determined based on data provided by the sensors 108 e.g., voltage measurements for the pixels as measured by the image sensor 115 and/or light conditions measured by the light sensors 114), location devices 110 (e.g., a physical location, such as a tunnel, associated with certain light conditions, as identified using data from the receiver 116), and/or one or more other vehicle systems 105 (e.g., by known operation of a vehicle headlight system, a vehicle interior lighting system, and/or other vehicle light systems, for example including a known projection of light in front of, in back of, or on one or more sides of the vehicle by a vehicle light system).

As depicted in FIG. 1, the controller 112 comprises a computer system. In certain embodiments, the controller 112 may also include one or more cameras 102, sensors 108, location devices 110, other vehicle systems 105, and/or components thereof. In addition, it will be appreciated that the controller 112 may otherwise differ from the embodiment depicted in FIG. 1. For example, the controller 112 may be coupled to or may otherwise utilize one or more remote computer systems and/or other control systems, for example as part of one or more of the above-identified vehicle 100 devices and systems.

In the depicted embodiment, the computer system of the controller 112 includes a processor 118, a memory 120, an interface 122, a storage device 124, and a bus 126. The processor 118 performs the computation and control functions of the controller 112, and may comprise any type of processor or multiple processors, single integrated circuits such as a microprocessor, or any suitable number of integrated circuit devices and/or circuit boards working in cooperation to accomplish the functions of a processing unit. During operation, the processor 118 executes one or more programs 128 contained within the memory 120 and, as such, controls the general operation of the controller 112 and the computer system of the controller 112, generally in executing the processes described herein, such as the process 200 described further below in connection with FIG. 2 as well as the implementations discussed further below in connection with FIGS. 3-8.

The memory 120 can be any type of suitable memory. For example, the memory 120 may include various types of dynamic random access memory (DRAM) such as SDRAM, the various types of static RAM (SRAM), and the various types of non-volatile memory (PROM, EPROM, and flash). In certain examples, the memory 120 is located on and/or co-located on the same computer chip as the processor 118. In the depicted embodiment, the memory 120 stores the above-referenced program 128 along with one or more stored values 130.

The bus 126 serves to transmit programs, data, status and other information or signals between the various components of the computer system of the controller 112. The interface 122 allows communication to the computer system of the controller 112, for example from a system driver and/or another computer system, and can be implemented using any suitable method and apparatus. In one embodiment, the interface 122 obtains the various data from the cameras 102, sensors 108, location devices 110, and other vehicle systems 105 regarding the light pattern, and the processor 118 determines the light pattern based on the data.

Also in various embodiments, the interface 122, along with the sensors 108, location devices 110, cameras 102 (e.g., the imager 103 and/or a sensor thereof), and/or other vehicle systems 105, may be referred to as one or more input units that ascertain such data for the processor 118 to use in determining the light pattern in proximity to the vehicle 100. In various embodiments, the interface 122 can include one or more network interfaces to communicate with other systems or components. The interface 122 may also include one or more network interfaces to communicate with technicians, and/or one or more storage interfaces to connect to storage apparatuses, such as the storage device 124.

The storage device 124 can be any suitable type of storage apparatus, including direct access storage devices such as hard disk drives, flash systems, floppy disk drives and optical disk drives. In one exemplary embodiment, the storage device 124 comprises a program product from which memory 120 can receive a program 128 that executes one or more embodiments of one or more processes of the present disclosure, such as the steps of the process 300 (and any sub-processes thereof) described further below in connection with FIG. 3. In another exemplary embodiment, the program product may be directly stored in and/or otherwise accessed by the memory 120 and/or a disk (e.g., disk 132), such as that referenced below.

The bus 126 can be any suitable physical or logical means of connecting computer systems and components. This includes, but is not limited to, direct hard-wired connections, fiber optics, infrared and wireless bus technologies. During operation, the program 128 is stored in the memory 120 and executed by the processor 118.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 118) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 112 may also otherwise differ from the embodiment depicted in FIG. 1, for example in that the computer system of the controller 112 may be coupled to or may otherwise utilize one or more remote computer systems and/or other control systems.

Figure 2:
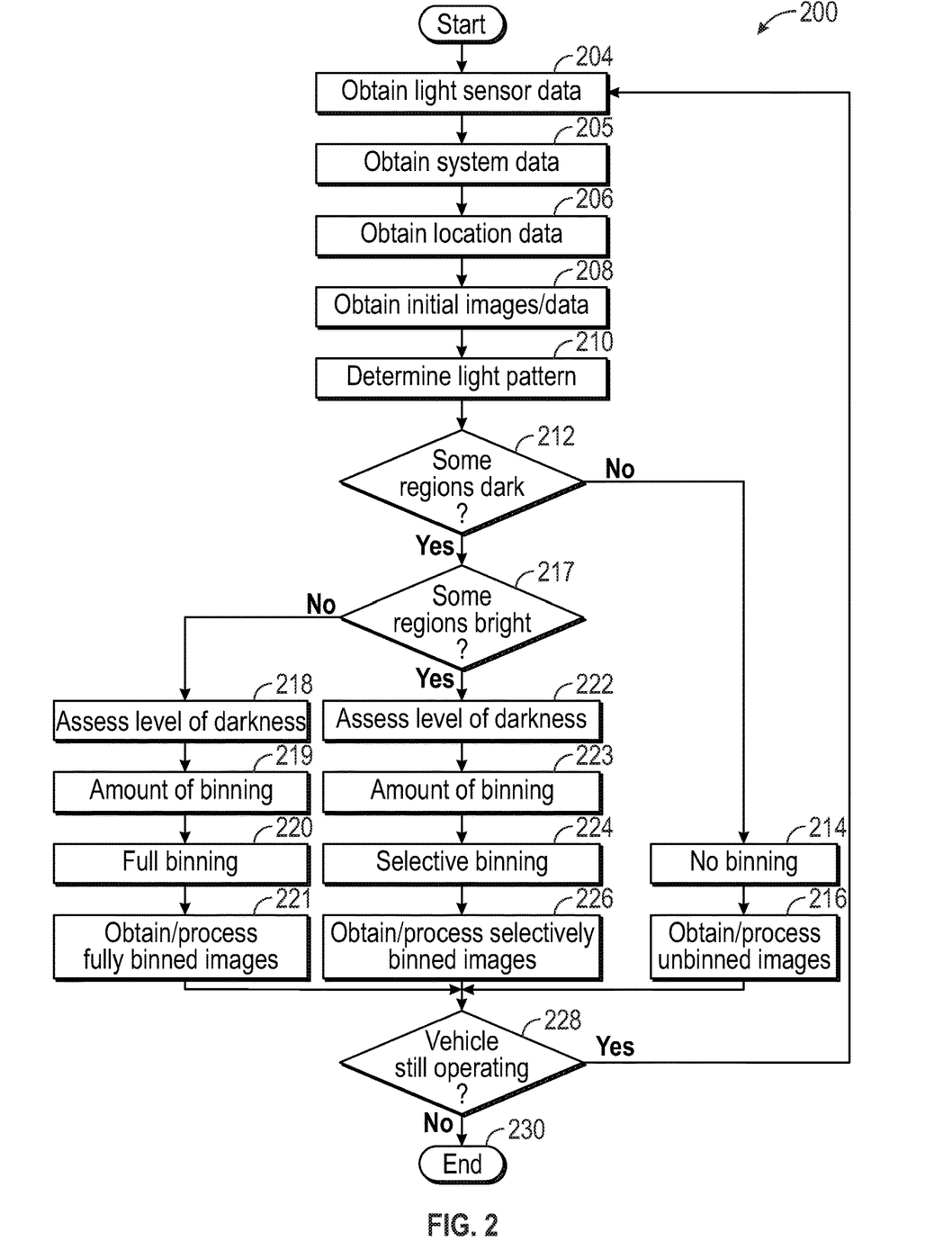
FIG. 2 is a flowchart of a process for controlling a camera of a vehicle, and that can be implemented in connection with the vehicle, camera, and control system of FIG. 1, in accordance with exemplary embodiments.

FIG. 2 is a flowchart of a process for controlling a camera of a vehicle, in accordance with exemplary embodiments. The process 200 can be implemented in connection with the vehicle 100, the camera 102, the control system 104, and display 106 of FIG. 1, in accordance with exemplary embodiments.

As depicted in FIG. 2, the process 200 begins at step 202. In certain embodiments, the process 200 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on). In certain other embodiments, the process 200 begins when the cameras 102 are activated (e.g., when the vehicle 100 is being operated with the cameras 102 turned on, and so on). In certain embodiments, the steps of the process 200 are performed continuously during operation of the vehicle.

In various embodiments, light sensor data is obtained (step 204). In certain embodiments, sensor data is obtained from the light sensors 114 of FIG. 1 with respect to light conditions within the vehicle 100 and outside/surrounding the vehicle 100, including regions that are likely to be included in camera images for the cameras 102. Also in various embodiments, the light sensor data is provided to the processor 118 of FIG. 1 for processing.

In various embodiments, system data is obtained (step 205). In certain embodiments, the system data is obtained from one or more other systems 105 of FIG. 1, such as a headlight system, interior lighting system, and/or other vehicle light system (e.g., known operation thereof), that affect light conditions inside or outside the vehicle 100. For example, in certain embodiments, the system data comprises operational data for the headlight system, interior lighting system, and/or other lighting systems that includes known or expected light patterns in proximity to the vehicle 100 (e.g., inside or outside the vehicle 100) based on the operation of (e.g., based on operational instructions for) such systems 105, with respect to regions that are likely to be included in camera images for the cameras 102. In certain embodiments, the system data is received via the interface 122 and/or one or more receivers 116 of FIG. 1. Also in various embodiments, the system data is provided to the processor 118 of FIG. 1 for processing.

In various embodiments, location data is obtained (step 206). In various embodiments, the location data is obtained from the location device(s) 110 of FIG. 1 with respect to a current location of the vehicle with respect to one or more physical structures or objects that may affect light patterns within or around the vehicle 100. In certain embodiments, the location data is obtained via the receiver 116 of FIG. 1, for example as part of or from a satellite-based location system (e.g., a GPS system) and/or one or more other communication systems (e.g., via vehicle to vehicle and/or vehicle to infrastructure communications). Also in certain embodiments, the physical structures or objects may include, by way of example only, street lights, tunnels, bridges, mountains, skyscrapers, other buildings, large rock formations, vegetation, trees, and/or other physical structures or objects that may affect light patterns within or outside the vehicle 100. By way of example, as a vehicle 100 approaches, drives through, or enters a tunnel, certain regions within or outside the vehicle 100 may be brighter or darker at various points in time. By way of an additional example, if a mountain range, skyscraper, vegetation, or the like is one a particular side of the vehicle 100, this may affect light patterns at different regions within or surrounding the vehicle 100, and so on. By way of further example, if street lights are on a particular side of the vehicle 100, this may also affect light patterns at different regions within or surrounding the vehicle 100, and so on. Also in various embodiments, the location data is provided to the processor 118 of FIG. 1 for processing.

In certain embodiments, initial camera images and data pertaining thereto are obtained (step 208). In various embodiments, initial camera images from one or more of the cameras 102 of FIG. 1 are obtained at step 208, along with initial voltage information and/or measurements of the various pixels of the camera images as measured by one or more image sensors 115 of FIG. 1. Also in various embodiments, this information (e.g., the voltage information) is provided to the processor 118 of FIG. 1 for processing, for use in selectively binning of pixels in subsequent camera images (e.g., in subsequent frames).

Light patterns are determined for the vehicle 100 (step 210). In various embodiments, the processor 118 of FIG. 1 determines one or more light patterns in proximity to the vehicle 100 based on the sensor data of step 204, the system data of step 205, the location data of step 206, and/or the initial camera image data of step 208. Also in various embodiments, the light patterns determined in step 210 comprise patterns of light (e.g., relative light intensity patterns) at various locations (also referred to herein as regions or area) within or outside the vehicle 100 that are likely to be included in camera images that are captured by one or more cameras 102 of the vehicle 100.

For example, in certain embodiments in which a camera 102 is pointed inside the vehicle 100 to capture images from within the vehicle 100, then a light pattern would be determined for the region inside the vehicle 100 that is likely to be captured by the camera images from the camera 102. Similarly, in certain embodiments in which cameras 102 are pointed outside the vehicle 100 in one or more directions to capture images outside the vehicle 100, then light patterns would be determined for each of the regions outside the vehicle 100 that are likely to be captured by the camera images from the cameras 102 (e.g., in each of the directions that the cameras 102 are pointing, in certain embodiments).

A determination is made as to whether any of the regions are dark regions (step 212). In certain embodiments, a separate determination is made for each camera 102 as to whether at least one of the regions expected to be captured by camera images for the particular camera 102 is dark. In certain embodiments, these determinations are made by the processor 118 of FIG. 1. Also in certain embodiments, a region is determined to be a "dark region" if a light intensity for the region is less than a predetermined threshold, using the light patterns of step 210 (i.e., using the light sensor data of step 204, the system data of step 205, the location data of step 206, and/or the initial image data of step 208). Conversely, in certain embodiments, a region is determined to be a "bright region" if a light intensity for the region is greater than a predetermined threshold, using the light patterns of step 210.

If it is determined at step 212 that none of the regions are "dark regions", then no binning is performed (step 214). Specifically, in certain embodiments, for a particular camera 102 in which no "dark regions" are included in the camera images for the camera 102 (i.e., all of the regions for this camera 102 are "bright regions"), then, during step 214, no binning is performed for the images of this particular camera 102. Rather, at step 214, all of the pixels for this particular camera 102 remain un-binned. Specifically, in various embodiments, no binning is required due to the "bright regions", and therefore a higher resolution is obtained by not binning the pixels. In addition, in various embodiments, following step 214, the un-binned camera images are obtained and processed, and are provided for viewing on one or more displays 106 of the vehicle 100, in accordance with instructions provided by the processor 118 (step 216). The process then proceeds to step 228, discussed further below.

Conversely, if it is determined at step 211 that at least one of the regions is dark, then a determination is made as to whether any of the regions are bright regions (step 217). In certain embodiments, a separate determination is made for each camera 102 as to whether at least one of the regions expected to be captured by camera images for the particular camera 102 is a bright region. In certain embodiments, these determinations are made by the processor 118 of FIG. 1.

If it is determined at step 217 that none of the regions are bright regions, then full binning is performed (steps 218-220). Specifically, in certain embodiments, for a particular camera 102 in which no "bright regions" are expected to be included in the camera images for the camera 102 (i.e., all of the regions for this camera 102 are "dark regions"), then, during steps 218-220, binning is performed for all (or substantially all) of the pixels of the images of this particular camera 102. In various embodiments, this allows for improved handling of the camera images in the darkness because the binned pixel groupings are larger than a single pixel, resulting in an increased voltage level for the photo diodes, so that a user can see more light in the camera images.

Specifically, in certain embodiments, at step 218, a level of darkness is assessed for each dark region, based on the light pattern. In various embodiments, the assessments are performed by the processor 118 of FIG. 1 based on the light pattern of step 210.

Also in certain embodiments, at step 219, an amount of binning is selected for each dark region, based on the level of darkness for the particular dark region. In various embodiments, regions that are considered relatively "less dark" (e.g., with a light intensity that is less than a first predetermined threshold to be characterized as a "dark" region but that is not less than a second predetermined threshold that would be characterized as a "very dark" region) are assigned binned pixel groups of a first size that is less than a second size for binned pixel groups of a "very dark" region (e.g., with a light intensity that is less than the second predetermined threshold). For example, in certain embodiments, a "less dark" region may be assigned 2×2 groups of binned pixels, while a "very dark" region may be assigned 4×4 groups of binned pixels, and so on (the numbers and sizes may vary in different embodiments). In various embodiments, the selection (or assignment) of the size of the binned pixel groups is determined by the processor 118 of FIG. 1.

Also in various embodiments, the binning is performed at step 220. Specifically, in various embodiments, for a particular camera 102 in which no "bright regions" are expected to be included in the camera images for the camera 102 (i.e., all of the regions for this camera 102 are "dark regions"), during step 220 binning is performed for all (or substantially all) of the pixels of the images of this particular camera 102. Also in various embodiments, during step 220, for each of the dark regions, the size of the binned pixel groups is determined based on the darkness level for each region (e.g., "very dark" regions have binned regions of a greater size than "less dark" regions in certain embodiments, and so on).

In addition, in various embodiments, following step 220, the fully binned camera images are obtained and processed, and are provided for viewing on one or more displays 106 of the vehicle 100, in accordance with instructions provided by the processor 118 (step 221). The process then proceeds to step 228, discussed further below.

Conversely, if it is determined at step 217 that at least one of the regions is then partial (or selective) binning is performed (steps 222-224). Specifically, in certain embodiments, for a particular camera 102 in which some "bright regions" and some "dark regions" are both expected to be included in the camera images for the camera 102, then, during steps 222-224, selectively binning is performed for some, but not all, of the pixels of the images of this particular camera 102. Specifically, in certain embodiments, for each image frame for this camera 102, binning is performed for the "dark regions", but not for the "bright regions", of the frame. In various embodiments, this allows for improved handling of the camera images in the darkness for the "dark regions", while also maintaining improved resolution for the camera images for the "bright regions".

Specifically, in certain embodiments, at step 222 (similar to step 218, described above), a level of darkness is assessed for each dark region, based on the light pattern. In various embodiments, the assessments are performed by the processor 118 of FIG. 1 based on the light pattern of step 210.

Also in certain embodiments, at step 223 (similar to step 219, described above), an amount of binning is selected for each dark region, based on the level of darkness for the particular dark region. In various embodiments, regions that are considered relatively "less dark" (e.g., with a light intensity that is less than a first predetermined threshold to be characterized as a "dark" region but that is not less than a second predetermined threshold that would be characterized as a "very dark" region) are assigned binned pixel groups of a first size that is less than a second size for binned pixel groups of a "very dark" region (e.g., with a light intensity that is less than the second predetermined threshold). For example, in certain embodiments, a "less dark" region may be assigned 2×2 groups of binned pixels, while a "very dark" region may be assigned 4×4 groups of binned pixels, and so on (the numbers and sizes may vary in different embodiments). In various embodiments, the selection (or assignment) of the size of the binned pixel groups is determined by the processor 118 of FIG. 1.

Also in various embodiments, the selective binning is performed at step 224. Specifically, in various embodiments, for a particular camera 102 in which some "bright regions" and some "dark regions" are both expected to be included in the camera images for the camera 102, during step 224 selectively binning is performed for some, but not all, of the pixels of the images of this particular camera 102. Specifically, in certain embodiments, for each image frame for this camera 102, binning is performed for the "dark regions", but not for the "bright regions", of the frame. Also in various embodiments, during step 224, for each of the dark regions, the size of the binned pixel groups is determined based on the darkness level for each region (e.g., "very dark" regions have binned regions of a greater size than "less dark" regions in certain embodiments, and so on).

In addition, in various embodiments, following step 224, the partially binned camera images are obtained and processed, and are provided for viewing on one or more displays 106 of the vehicle 100, in accordance with instructions provided by the processor 118 (step 226). The process then proceeds to step 228, discussed further below.

FIGS. 3-8 depict various illustrative examples of certain steps of the process 200 of FIG. 2 for when selective binning is implemented in step 224, specifically in which certain regions are "dark regions" and certain other regions are "bright regions" (for example for a particular camera 102).

Figure 3:
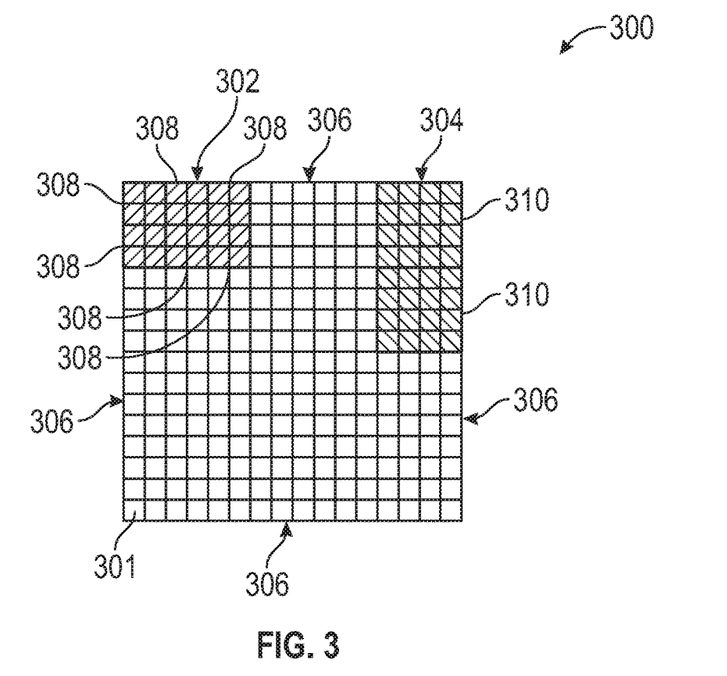
FIG. 3 depicts an illustration of an exemplary camera image frame that is partially binned, and that can be implemented in connection with the process of FIG. 2 and the camera and control system of FIG. 1, in accordance with exemplary embodiments.

First, FIG. 3 depicts an illustration of an exemplary camera image frame 300 that is partially binned, in accordance with exemplary embodiments. The image frame 300 of FIG. 3 can be implemented in connection with the process 200 of FIG. 2 and the camera 102 and control system 104 of FIG. 1, in accordance with exemplary embodiments.

Specifically, in the example of FIG. 3, the frame 300 includes a number of pixels 301. In the exemplary frame 300 of FIG. 3, a 16×16 array of pixels 301 is provided (i.e., for 256 total pixels). Some of the pixels 301 are binned, while other of the pixels 301 are not binned. In the depicted embodiment, multiple binning regions 302, 304 may be utilized for the binning of the pixels 301 for the frame 300. In other embodiments, a single number of binning regions, or more than two binning regions, may also be utilized. Also as depicted in FIG. 3, the pixels 301 that are not in the binned regions 302, 304 are part of an un-binned region 306 for the frame 300.

As illustrated in FIG. 3, in certain embodiments adjacent pixels 301 are binned together as part of the binned regions

302, 304. In certain embodiments, the pixels 301 need not be adjacent to be binned. For example, in certain embodiments, the pixels 301 may be relatively close to one another (e.g., separated by only a few other pixels 301 or less) to be candidates for binning. Also in certain embodiments, pixels 301 of a like color (e.g., the same color) are binned together.

In the example of FIG. 3, the first binning region 302 includes six binned pixel sets 308. Each binned pixel set 308 of the first region 302 has four pixels 301 binned together in the depicted embodiment, for a 2×2 binned pixel set 308. Also in the example of FIG. 3, the second binning region 302 includes two binned pixel sets 310. In this particular example, each binned pixel set 310 of the second region 304 has sixteen pixels 301 binned together in the depicted embodiment, for a 4×4 pixel set 310. However, this may vary in other examples. For example, in various embodiments, the first binning region 302 may include any combination of 2×2 blocks, the second binning region 304 may include any combination of 4×4 blocks, and so on. Also in various embodiments, there could be any number of different sizes and/or shapes as to how to achieve the binning.

In various embodiments, the first and second binned regions 302, 304 correspond to regions that are determined to be "dark regions" (e.g., for which a light intensity is determined to be less than a predetermined threshold). Conversely, in various embodiments, the un-binned region 306 corresponds to regions that are determined to be "bright regions" (e.g., for which a light intensity is determined to be greater than a predetermined threshold). It will be appreciated that the number and nature of the different binned and un-binned regions may vary in other examples and/or in other embodiments.

Also in various embodiments, for the different "dark regions", the size of the binned pixel groups for the different regions may vary based on the relative darkness of the different dark regions. For example, similar to the discussions above with respect to the process 200 of FIG. 2, in various embodiments, a "less dark" region may include the 2×2 binned set 308 of the first region 302 of FIG. 3, whereas a "very dark" region may include the 4×4 binned pixel set 310 of the second region of FIG. 4, and so on (also per the discussions above, it will be appreciated that the particular number and/or size of the binned pixel groups may vary in different embodiments).

Figure 4:
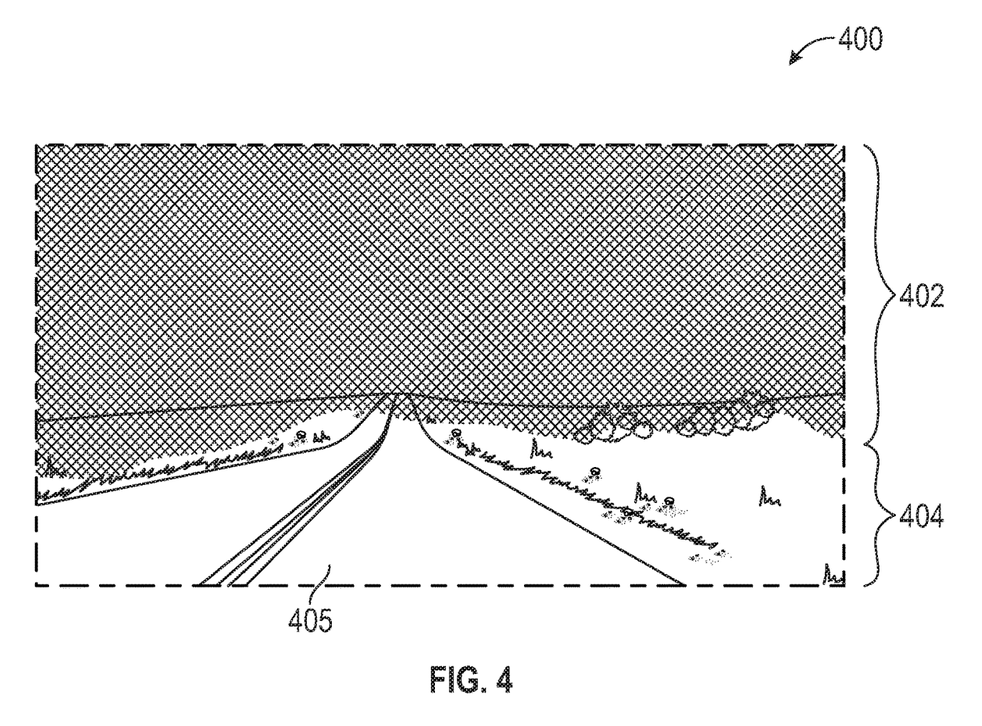
FIG. 4 depicts an illustration of a view outside a vehicle, including a dark region and a bright region, and that can be implemented in connection with the process of FIG. 2 and the camera and control system of FIG. 1, in accordance with exemplary embodiments.

FIG. 4 depicts an illustration of a view 400 outside a vehicle, including a "dark region" 402 and a "bright region" 404, in accordance with exemplary embodiments. The view 400 of FIG. 4 can be implemented in connection with the process 200 of FIG. 2 and the camera 102 and control system 104 of FIG. 1, in accordance with exemplary embodiments. In various embodiments, the view 400 of FIG. 4 comprises a view in front of the vehicle 100 as the vehicle 100 is driven along a road 405. In various embodiments, the exemplary view 400 of FIG. 4 includes the "dark region" 402 in an upper portion of the view 400, and the "bright region" 404 in a lower portion of the view 400. In various embodiments, the "dark region" 402 has a light intensity that is less than a predetermined threshold, and the "bright region" 404 has a light intensity that is greater than the predetermined threshold.

In the depicted embodiment, a light system of the vehicle 100 (e.g., via a headlight system and/or other light system of the other systems 105 of FIG. 1) provide light for the "bright region" 404 in front of the vehicle 100 from the road 405 up to a certain height, thereby providing light for the "bright region" 404. Also in the depicted embodiment, the "dark region" 402 includes a region above the reach of the headlights and/or other lights, thereby resulting in a darker view. In various embodiments, the "bright regions" and "dark regions" may be determined by known or expected projection patterns of light from a headlight system and/or other light system of the vehicle 100. In other embodiments, the "bright regions" and "dark regions" may be determined based on measurements of voltage of pixels of initial camera images as measured by the image sensors 115.

Figure 5:
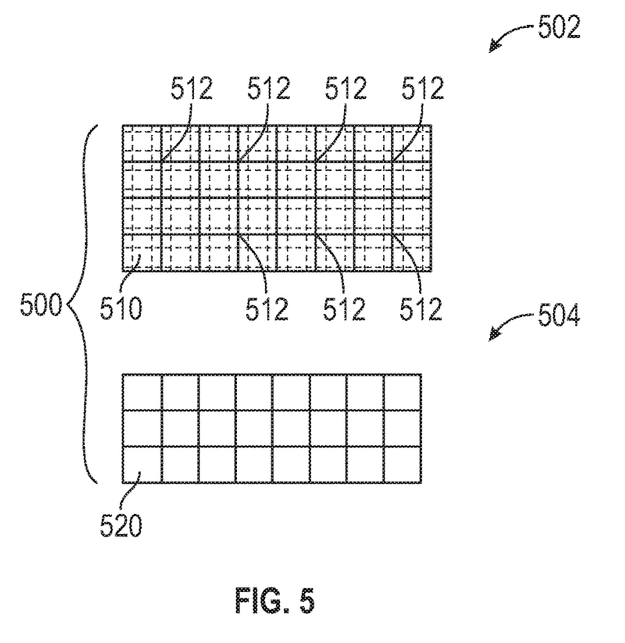
FIG. 5 depicts an illustration of an exemplary camera image frame for the view of FIG. 5, including a first portion having binned pixels for the dark region of the view, and a second portion having un-binned pixels for the bright region of the vehicle, and that can be implemented in connection with the process of FIG. 2 and the camera and control system of FIG. 1, in accordance with exemplary embodiments.

FIG. 5 depicts an illustration of an exemplary camera image frame 500 for the view 400 of FIG. 4, in accordance with exemplary embodiments. Accordingly, in various embodiments, the camera image frame 500 of FIG. 5 can be implemented in connection with the process 200 of FIG. 2 and the camera 102 and control system 104 of FIG. 1.

As depicted in FIG. 5, the frame 500 includes a binned region 502 and an un-binned region 504. In various embodiments, the binned region 502 is used for portions of the image/frame corresponding to the "dark region" 402 of FIG. 4. Also in various embodiments, the un-binned region 504 is used for portions of the image/frame corresponding to the "bright region" 404 of FIG. 4.

In various embodiments, the binned region 502 includes pixels 510 that are binned together in groups. Specifically, in the example of FIG. 5, the binned region 502 includes eight binned pixel sets 512. Each binned pixel set 512 of the binned region 502 has four pixels 510 binned together in the depicted embodiment, for a 2×2 binned pixel set 512. In various embodiments, the number, size, and/or configuration of the pixels 510 and/or the binned pixel sets 512 may vary. In various embodiments, the binned pixel sets 512 provide for more robust viewing of images in the "dark region" 402 of FIG. 4, for example by increasing the effective pixel size and voltage for the images corresponding to the "dark region" 402.

Also in various embodiments, the un-binned region 504 includes pixels 520 that are not binned together in groups. Specifically, in the example of FIG. 5, the un-binned region 504 includes a 3×8 array of pixels 520 that are not binned together. In various embodiments, the number and/or placement of the un-binned pixels 520 may vary. In various embodiments, the un-binned region provides for increased resolution of images in the "bright region" 404 of FIG. 4.

As noted above, it will be appreciated that the configurations of the binned region 502 and un-binned region 504 of the frame 500 of FIG. 5 may vary in other embodiments. In addition, while the binned region 502 and un-binned region 504 are depicted as being identical in size to one another, it will be appreciated that this may similarly vary in different embodiments (e.g., this may vary based on the relative size of the "dark region" 402 and "bright region" 404 of FIG. 4, and so on).

Figure 6:
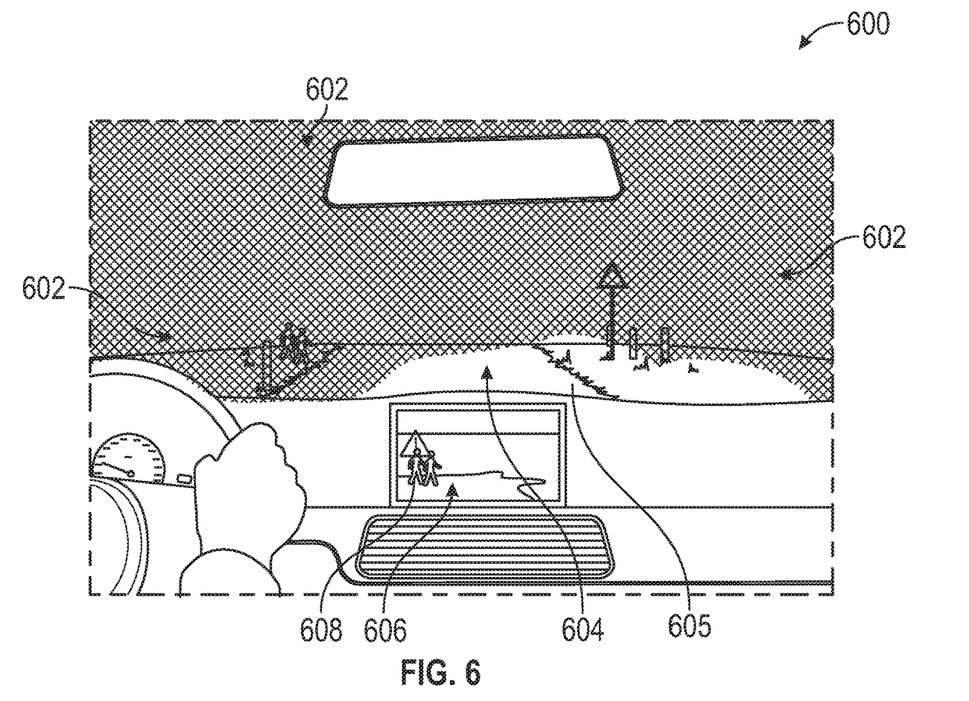
FIG. 6 depicts an illustration of a view outside a vehicle, including a dark region and a bright region, as experienced by a driver inside the vehicle, depicted along with a warning system depicting a pedestrian alongside the vehicle, and that can be implemented in connection with the process of FIG. 2 and the camera and control system of FIG. 1, in accordance with exemplary embodiments.

FIG. 6 depicts an illustration of a view 600 outside a vehicle, as viewed by a driver or other occupant inside the vehicle 100, in accordance with exemplary embodiments. In various embodiments, the view 600 includes a "bright region" 604 in the middle, from the road 605 on up to a certain height (e.g., corresponding to the coverage of the vehicle headlights) surrounded by "dark regions" 602 on the sides as well as above the "bright region" 604. In various embodiments, the "bright region" 604 has a light intensity that is greater than a predetermined threshold, and the "dark regions" 602 have light intensities that are greater than the predetermined threshold. The view 600 of FIG. 6 can be implemented in connection with the process 200 of FIG. 2 and the camera 102 and control system 104 of FIG. 1, in accordance with exemplary embodiments.

In the depicted embodiment, lights of the vehicle 100 (e.g., via a headlight system and/or other light systems of the other systems 105 of FIG. 1) provide light for the "bright region" 604 in front of the vehicle 100 along a portion of the road that is centered by the vehicle 100, from the level of the road 605 up to a certain height. Also in the depicted embodiment, the "dark regions" 602 include regions to the right of, to the left of, and above the "bright region" 604 and (i.e., to the right of, to the left of, and above the concentration of light from the vehicle headlights and/or other lights). In various embodiments, the "bright regions" and "dark regions" may be determined by known or expected projection patterns of light from a headlight system of the vehicle 100. In other embodiments, the "bright regions" and "dark regions" may be determined based on measurements of voltage of pixels of initial camera images as measured by the image sensors 115. Also in the depicted embodiment is a display 606 showing a pedestrian 608 to one side of the vehicle 100.

Figure 7:
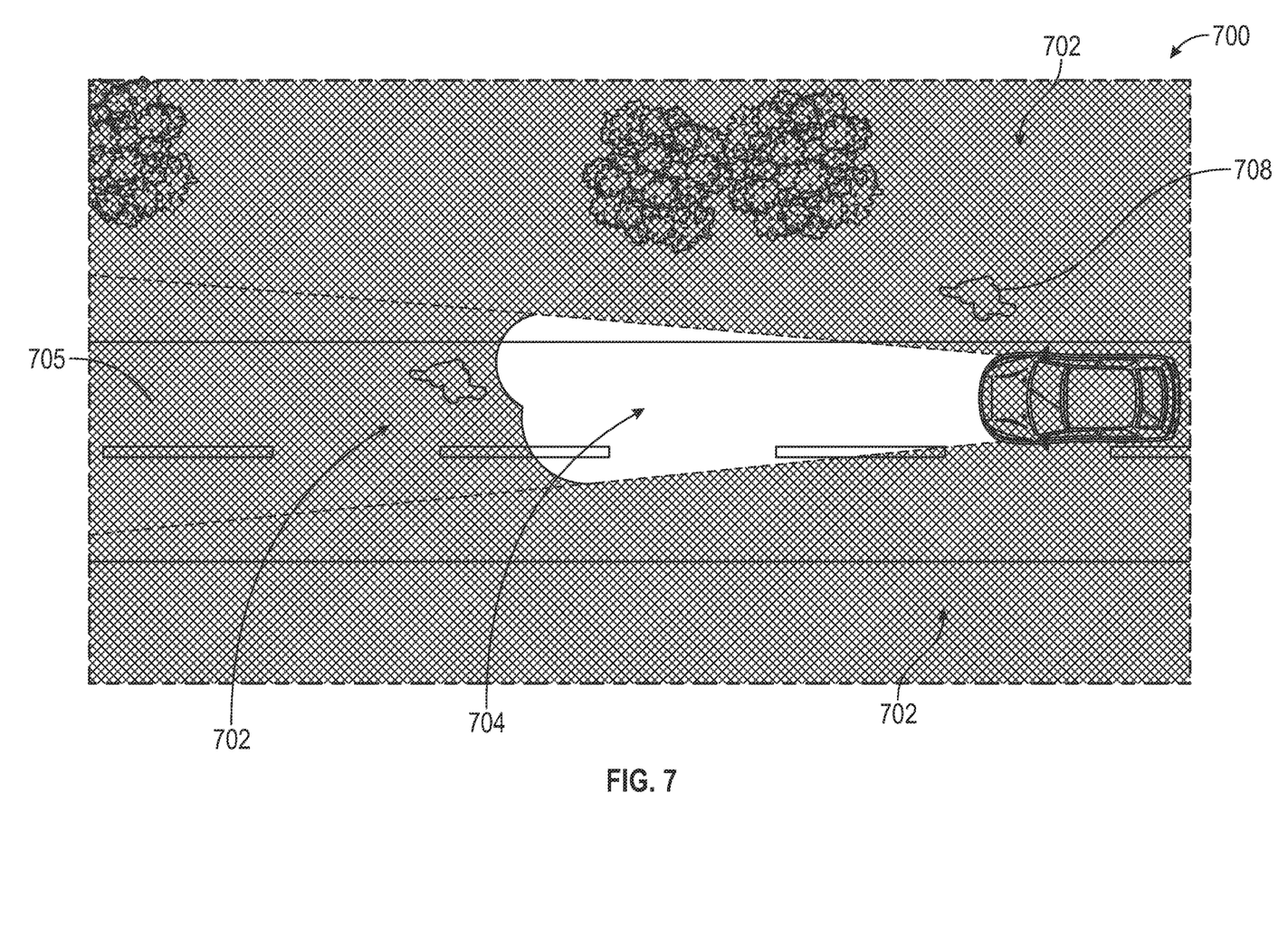
FIG. 7 depicts a top down illustration of the view of FIG. 6, with a view as would be experienced from above the vehicle, in accordance with exemplary embodiments.

FIG. 7 depicts an illustration of a view 700 outside a vehicle, corresponding to the scenario of FIG. 6, but shown from a top down view from above the vehicle 100 as travelling along a road 705, in accordance with exemplary embodiments. In various embodiments, the view 700 includes a "bright region" 704 directly in front of the vehicle 100, corresponding to the "bright region" 604 of FIG. 6. Also in various embodiments, the view 700 also includes "dark regions" 702 on the sides of the "bright region" 704 (and would also include a non-depicted "dark region" 702 above the "bright region" 704), with the "dark regions" 702 corresponding to the "dark regions" 602 of FIG. 6. Also depicted in FIG. 7 is a pedestrian 708 (e.g., corresponding to the pedestrian 608 of FIG. 6) disposed in a "dark region" 702 alongside the vehicle 100.

Figure 8:
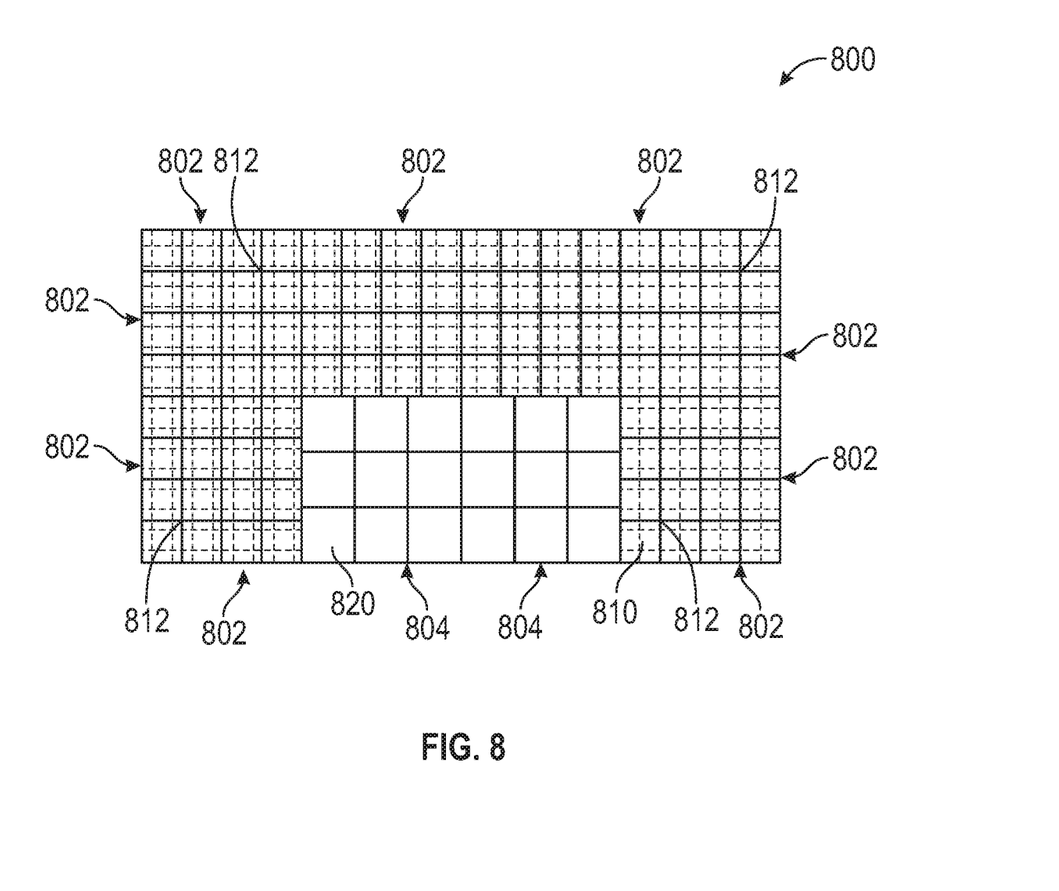
FIG. 8 depicts an illustration of an exemplary camera image frame for the view of FIGS. 6 and 7, including a first portion having binned pixels for the dark region of the view, and a second portion having un-binned pixels for the bright region of the vehicle, and that can be implemented in connection with the process of FIG. 2 and the camera and control system of FIG. 1, in accordance with exemplary embodiments.

FIG. 8 depicts an illustration of an exemplary camera image frame 800 for the views 600, 700 of FIGS. 6 and 7, in accordance with exemplary embodiments. Accordingly, in various embodiments, the camera image frame 800 of FIG. 8 can be implemented in connection with the process 200 of FIG. 2 and the camera 102 and control system 104 of FIG. 1.

As depicted in FIG. 8, the frame 800 includes binned regions 802 and an un-binned region 804. In various embodiments, the binned regions 802 are used for portions of the image/frame corresponding to the "dark regions" 602, 702 of FIGS. 6 and 7. Also in various embodiments, the un-binned region 804 is used for portions of the image/frame corresponding to the "bright regions" 604, 704 of FIGS. 6 and 7.

In various embodiments, the binned regions 802 include pixels 810 that are binned together in groups. Specifically, in the example of FIG. 8, the binned regions 802 include twenty four binned pixel sets 812. Each binned pixel set 812 of the binned regions 802 has four pixels 810 binned together in the depicted embodiment, for a 2×2 binned pixel set 812. In various embodiments, the number, size, and/or configuration of the pixels 810 and/or the binned pixel sets 812 may vary. In various embodiments, the binned pixel sets 812 provide for more robust viewing of images in the "dark regions" 602, 702 of FIGS. 6 and 7, for example by increasing the effective pixel size and voltage for the images corresponding to the "dark regions" 602, 702.

Also in various embodiments, the un-binned region 804 includes pixels 820 that are not binned together in groups. Specifically, in the example of FIG. 8, the un-binned region 804 includes a 3×6 array of pixels 820 that are not binned together. However, this may vary in various embodiments.

In various embodiments, the number and/or placement of the un-binned pixels 820 may vary. In various embodiments, the un-binned region provides for increased resolution of images in the "bright regions" 604, 704 of FIGS. 6 and 7. As noted above, it will be appreciated that the configurations of the binned regions 802 and un-binned region 804 of the frame 800 of FIG. 8 may vary in other embodiments.

While FIGS. 4-8 provide illustrative examples for certain embodiments involving regions in front of the vehicle that are partially illuminated by vehicle lights (e.g., headlights), it will be appreciated that the techniques disclosed herein may be similarly implemented in other contacts. For example, the selectively pixel binning may similarly be implemented for other lighting systems of the vehicle 100, for example, in an interior lighting system that illuminates some or all of a passenger cabin of a vehicle, and/or lighting systems from other nearby vehicles or other objects, such as from buildings, street lights, and so on. By way of additional example, if the vehicle 100 is approaching, travelling, through a tunnel, mountain range, downtown area, forest, and so on with differential light patterns surrounding the vehicle 100 (e.g., as determined via light sensor data, vehicle location data, voltage from initial camera images, and so on), then selective binning of certain of the pixels of the camera image frames may similarly be implemented.

With reference back to FIG. 2, during step 228, a determination is made as to whether the vehicle 100 is still operating in a manner using one or more cameras 102. In various embodiments, this determination is made by the processor 118 of FIG. 1. In certain embodiments, the vehicle 100 would still be operating in a manner using one or more cameras 102 if the vehicle 100 is running (e.g., the engine is still turned on), the current ignition cycle is continuing, and/or the cameras 102 are still turned on. Also in certain embodiments, the vehicle 100 would not be operating in a manner using one or more cameras 102 if the vehicle 100 has stopped running (e.g., an engine has been turned off), the current ignition cycle is over, and/or the cameras 102 have been turned off.

In various embodiments, if it is determined at step 228 that the vehicle 100 is still operating in a manner using one or more cameras 102, then the process returns to step 204, and the process continues in a new iteration with a new iteration of step 204, with updated data, determinations, and actions. In various embodiments, new data is updated in this manner continually during operation of the vehicle 100. Also in various embodiments, the binning is adjusted dynamically frame to frame depending on the dynamics of the scene and changes to light patterns between subsequent frames.

Conversely, in various embodiments, if it is determined at step 228 that the vehicle 100 is no longer operating in a manner using one or more cameras 102, then the process terminates (step 230).

Accordingly, the systems, vehicles, and methods described herein provide for controlling camera images of cameras for a vehicle. In accordance with various embodiments, the pixels of the camera images are selectively binned based on light conditions within or in proximity to the vehicle. Specifically, in various embodiments, for "dark regions" that are to be included by the camera images, the pixels are binned, to thereby improve handling and viewing for the image areas corresponding to these regions. Also in various embodiments, for "bright regions" that are to be included by the camera images, the pixels are not binned, to thereby provide increased resolution for the image areas corresponding to these regions. In various embodiments, each camera image frame will be selectively binned in this manner, to thereby include binned and un-binned regions within each image frame that covers both "bright regions" and "dark regions" within or surrounding the vehicle.

The systems, vehicles, and methods thus provide for potentially improved camera images for viewing by users of the vehicle. For example, for "bright regions" having a light intensity that is greater than a predetermined threshold, the viewer can view such regions with greater resolution, due to non-binning of pixels in these regions (i.e., resulting in relatively larger number of pixels, for greater resolution). Conversely, for "dark regions' having a light intensity that is less than a predetermined threshold, the viewer can view such regions with greater ease (e.g., with greater light in the camera image) due to the binning of the pixels in these "dark regions", for example because the binned pixel groupings are larger than a single pixel, resulting in an increased voltage level for the photo diodes. It will be appreciated that the systems, vehicles, and methods may vary from those depicted in the Figures and described herein. For example, the vehicle 100, the camera 102, the control system 104, the display 106, and/or various components thereof may vary from that depicted in FIG. 1 and described in connection therewith, in various embodiments. It will similarly be appreciated that the steps of the process 200 may differ from those depicted in FIG. 2, and/or that various steps of the process 200 may occur concurrently and/or in a different order than that depicted in FIG. 2, in various embodiments. It will similarly be appreciated that the illustrations and examples of FIGS. 3-8 may differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for controlling camera images for a camera of a vehicle, the method comprising:
   determining a light pattern in proximity to the vehicle; and
   selectively binning pixels of the camera images based on the light pattern, the selectively binning comprising binning first pixels of the pixels together for a particular image or portion thereof, but leaving second pixels of the pixels for the particular image un-binned, based on the light pattern;
   wherein:
      the step of determining the light pattern comprises:
         determining one or more bright regions for the light pattern, the one or more bright regions each having a respective light intensity that is greater than a predetermined threshold; and
         determining one or more dark regions for the light pattern, the one or more dark regions each having a respective light intensity that is less than the predetermined threshold; and
      the step of selectively binning the camera images comprises, for each camera image:
         binning the first pixels together into one or more binned pixel groups for one or more first portions of the camera image corresponding to the dark regions; and
         leaving the second pixels un-binned for one or more second portions of the camera image corresponding to the bright regions.

2. The method of claim 1, further comprising:
determining an amount of darkness for each of the dark regions;
wherein, for each particular dark region, a size of the one or more binned pixel groups for the particular dark region is determined based on the amount of darkness for the particular dark region.

3. The method of claim 1, wherein:
the vehicle includes a light sensor; and
the step of determining the light pattern comprises determining the light pattern based on measurements from the light sensor.

4. The method of claim 1, wherein:
the vehicle includes a location device; and
the step of determining the light pattern comprises determining the light pattern based on information as to a location of the vehicle as obtained via the location device.

5. The method of claim 1, wherein:
the vehicle includes a lighting system; and
the step of determining the light pattern comprises determining the light pattern based on known operation of the lighting system.

6. The method of claim 1, wherein:
the vehicle includes a lighting system; and
the step of determining the light pattern comprises determining the light pattern based on data from a light sensor, data from a location sensor, and known operation of the lighting system.

7. A system for controlling camera images for a camera, the system comprising:
   an input unit comprising one or more sensors configured to obtain data pertaining to a light pattern in proximity to the camera; and
   a processor configured to at least facilitate:
      determining the light pattern in proximity to the camera using the data; and
      providing instructions for selectively binning the camera images based on the light pattern, the selectively binning comprising binning first pixels together for a particular image or portion thereof, but leaving second pixels for the particular image un-binned, based on the light pattern;
   wherein the processor is configured to at least facilitate:
      determining one or more bright regions for the light pattern, the one or more bright regions each having a respective light intensity that is greater than a predetermined threshold;
      determining one or more dark regions for the light pattern, the one or more dark regions each having a respective light intensity that is less than the predetermined threshold; and
      providing instructions for the selectively binning of the camera images by, for each camera image:
         binning the first pixels together into one or more binned pixel groups for one or more first portions of the camera image corresponding to the dark regions; and leaving the second pixels un-binned for one or more second portions of the camera image corresponding to the bright regions.

8. The system of claim 7, wherein the processor is configured to at least facilitate:
   determining an amount of darkness for each of the dark regions; and
   for each particular dark region, determining a size of the one or more binned pixel groups for the particular dark region based on the amount of darkness for the particular dark region.

9. The system of claim 7, wherein:
   the input unit comprises a light sensor; and
   the processor is configured to at least facilitate determining the light pattern based on measurements from the light sensor.

10. The system of claim 7, wherein:
    the camera is implemented in a vehicle;
    the input unit comprises a vehicle location device for the vehicle; and
    the processor is configured to at least facilitate determining the light pattern based on information as to a location of the vehicle as obtained via the vehicle location device.

11. The system of claim 7, wherein:
    the camera is implemented in a vehicle having a lighting system; and
    the processor is configured to at least facilitate determining the light pattern based on known operation of the lighting system.

12. The system of claim 7, wherein:
    the input unit comprises a light sensor and a location sensor,
    the camera is implemented in a vehicle having a lighting system; and
    the processor is configured to at least facilitate determining the light pattern based on data from the light sensor, data from the location sensor, and known operation of the lighting system.

13. A vehicle comprising:
    a camera;
    an input unit comprising a sensor configured to obtain data pertaining to a light pattern in proximity to the vehicle; and
    a processor configured to at least facilitate:
      determining the light pattern in proximity to the vehicle using the data; and
      providing instructions for selectively binning images of the camera based on the light pattern, the selectively binning comprising binning first pixels together for a particular image or portion thereof, but leaving second pixels for the particular image un-binned, based on the light pattern;
    wherein the processor is configured to at least facilitate:
      determining one or more bright regions for the light pattern, the one or more bright regions each having a respective light intensity that is greater than a predetermined threshold;
      determining one or more dark regions for the light pattern, the one or more dark regions each having a respective light intensity that is less than the predetermined threshold; and
      providing instructions for the selectively binning of the images by, for each camera image:
        binning the first pixels together into one or more binned pixel groups for one or more first portions of the camera image corresponding to the dark regions; and
        leaving the second pixels un-binned for one or more second portions of the camera image corresponding to the bright regions.

14. The vehicle of claim 13, wherein:
    the input unit comprises a light sensor; and
    the processor is configured to at least facilitate determining the light pattern based on measurements from the light sensor.

15. The vehicle of claim 13, wherein:
    the input unit comprises a vehicle location device; and
    the processor is configured to at least facilitate determining the light pattern based on information as to a location of the vehicle as obtained via the location device.

16. The vehicle of claim 13, further comprising:
    a lighting system;
    wherein the processor is configured to at least facilitate determining the light pattern based on known operation of the lighting system.

17. The vehicle of claim 16, wherein:
    the input unit comprises a light sensor and a location sensor, and
    the processor is configured to at least facilitate determining the light pattern based on data from the light sensor, data from the location sensor, and known operation of the lighting system.

* * * * *